May 24, 1949.  B. G. PETERS  2,471,376
APPARATUS FOR DEHUMIDIFICATION
Filed July 22, 1946  7 Sheets-Sheet 1

May 24, 1949.	B. G. PETERS	2,471,376
APPARATUS FOR DEHUMIDIFICATION
Filed July 22, 1946	7 Sheets-Sheet 4

Inventor
Brice G. Peters
By Charles W. Finlay
Attorney

May 24, 1949.     B. G. PETERS     2,471,376
APPARATUS FOR DEHUMIDIFICATION
Filed July 22, 1946     7 Sheets-Sheet 6

FIG. 11

Inventor
Brice G. Peters
By Charles V. Imlay
Attorney

Patented May 24, 1949

2,471,376

UNITED STATES PATENT OFFICE 2,471,376

APPARATUS FOR DEHUMIDIFICATION

Brice G. Peters, Baltimore, Md.

Application July 22, 1946, Serial No. 685,395

11 Claims. (Cl. 183—4.5)

My invention consists in a new and useful improvement in methods of and apparatus for dehumidification, and is more particularly designed for the treatment of air in confined spaces, such as rooms or other parts of buildings, in which the degree of humidity is required to be nicely determined, and an especially important application of my invention is the treatment of air in hermetically sealed chambers, such as storage containers, where means must be provided for expansion and contraction of the mass of air in the chamber due to variations of its temperature. The particularly novel and useful features of my improved method are the creation of a current of air from the confined space, said current being controlled automatically in accordance with the degree of humidity in the space, the treatment of the desiccant for its reactivation, and the automatic timing of the periods of dehumidification of the air and the reactivation of the desiccant. The foregoing features characterize the first form of my improved method, and my second form comprises said features and the additional feature of automatically evacuating air from and supplying air to the sealed chamber, responsive to pressure variations therein due to temperature variations, the supplied air being automatically dehumidified prior to entry into the chamber. The particularly novel and useful features of my improved apparatus for practicing my improved method are the economical and efficient disposition in a single casing of the structural elements whereby the novel device functions to produce the dehumidification and the reactivation of the desiccant during the determined periods, respectively, the control and functioning of the various valves controlling the induced air currents during the two periods to effect determined dehumidification and reactivation, respectively, the novel elements for effecting insulation of a heating means for the desiccant automatically functioning during the reactivation period only whereby the heat is confined to those portions of the device in which alone elevated temperature is desired, and especially the combination with the dehumidification means and the reactivation means of the means providing expansion and contraction of the mass of air in a sealed chamber. As will fully appear from the following detailed description of the structural elements of my improved device, my invention as to my improved apparatus provides a dynamic dehumidifier combined with a so-called "static-dynamic breather," which combination, so far as I know, has been hitherto unknown.

While I have illustrated in the drawings filed herewith and have hereinafter fully described certain specific embodiments of my invention, as to my improved apparatus, whereby my improved method may be practiced, it is to be distinctly understood that I do not consider my invention, as to my improved apparatus, to be limited to said specific embodiments, but refer for its scope to the claims appended hereto.

As illustrated in the drawings (Figs. 1–10), the operative elements of the device D are housed in a casing comprising a cylindrical wall 1 having inwardly turned circumferential flanges 2 and 3 at its opposite ends, respectively, and closure plates 4 and 5 attached by any suitable removable means, such as bolts 6, to the flanges 2 and 3, respectively. Suitably spaced between the plates 4 and 5, a partition 7 is supported in the casing by any suitable means, such as a circumferential L-flange 8. Ports P and P—1 are provided in the plate 4 (Fig. 4) and have valve-seats 9 and 10, respectively, disposed inwardly of the casing. Port P is provided with a conduit 11 connected with the interior of the confined space S. Port P—1 communicates to atmosphere. Ports P—2 and P—3 are provided in the plate 5 (Fig. 4) and have valve-seats 12 and 13, respectively, disposed inwardly of the casing. Port P—2 communicated to atmosphere, and port P—3 is provided with a conduit 14 connected with the interior of the confined space S. It should be noted that, as shown in Figures 3 and 4, the ports P—1 and P—2, defined by valve seats 10 and 12, through which re-activating air is circulated, as hereinafter explained, are relatively small, as compared to ports P and P—3, defined by valve seats 9 and 13, through which air to be dehumidified is circulated, as hereinafter expained, thereby reducing the velocity of the flow of re-activating air as compared to the velocity of flow of the air to be dried. A partition 15 extends inwardly from the cover plate 4 to partition 7, being suitably mounted on wall 1 and partition 7, as by flanges 16. Partition 15 has a port P—4 therethrough in which is disposed an air filter 17 suitably removably mounted on partition 15 by flanges 18 from which the filter 17 can be removed, outwardly, when the cover plate 4 is removed. The partition 7 is provided with a port P—5 with which is associated a radial blower 19 having its axial intake 20 disposed immediately adjacent port P—4, on the side of partition 15 opposite that on which filter 17 is disposed, and its discharge 21 communicating with port P—5 in partition 7. Blower 19 is driven by motor 22 suitably mounted on partition 7. A baffle plate 23 is connected in spaced relation to partition 7, facing port P—5. Another partition 24 projects from partition 7 and has flanges 25, at its opposite ends. The flange 25 at the end remote from partition 7 has its ends connected with an arcuate flange 26 suitably mounted on wall 1. This flange 25 and flange 26 form a seat for a desiccant container 27 provided with a peripheral flange 28 received against a suitable gasket 29, made of any suitable heat insulating material such as Eagle super 66, seated on flanges 25 and 26. An arcuate flange 30 is suitably mounted on wall 1, spaced from flange 26 and co-extensive therewith. Clips 31 bearings on blocks 32 of said heat insulating material, seated on flange 30, are attached to flange 28 by bolts 33. Thus the desiccant container 27 is completely isolated by heat insulating material, consisting of gasket 29 and blocks 32, from the casing side wall 1 and end plates 4 and 5 so that heat cannot be dissipated to the casing, but is confined to the desiccant material, where it performs its function of evaporating moisture in a most efficient manner. The container 27 comprises a circumferential wall 34 carrying foraminous top and bottom walls 35 and 36, and is filled with suitable desiccant 37, such as activated alumina and silica gel. The container 27 is provided with a suitable electric heater unit 38 having a thermostatic safety switch 39.

Mounted on partition 7, there is a plate 40 (Fig. 4) on which is pivoted a double lever 41 by bolt 42. The plate 40 is provided with suitable guideways 43 and 44 in which are slidably mounted valve-actuating rods 45 and 46, respectively, passing through partition 7 and orifices 47 in lower flange 25. The lever 41 is provided in its ends with pins 48 received in slots 49 in enlarged portions 50 of rods 45 and 46. Spring 51 coiled about bolt 42 has its left end fixed on plate 40 and its right end bearing on the portion of lever 41 to the right of its pivot point, thus tending to normally move the right portion of lever 41 clockwise and thereby urge the rod 45 toward port P—2. Mounted on partition 7 adjacent plate 40, there is a solenoid 52 (Figs. 2 and 10) having an operating finger 53 engaging the portion of lever 41 to the left of its pivot point, whereby the solenoid 52 rocks lever 41 on its pivot against pressure of spring 51 in a counterclockwise direction to move the left portion of lever 41 and thereby the rod 46 toward port P—3, the lever 41 at the same time moving rod 45 in the opposite direction. The rod 45 is provided on one end with valve 54 and on its other end with valve 55. These valves 54 and 55 co-act with valve-seats 9 and 12 of the ports P and P—2, respectively, to simultaneously open port P and close port P—2, and vice-versa, by the reciprocation of rod 45. The rod 46 is provided on one end with valve 56 and on its other end with valve 57. These valves 56 and 57 co-act with valve-seats 10 and 13 of ports P—1 and P—3, respectively, to simultaneously close port P—1 and open port P—3, and vice-versa, by the reciprocation of rod 46.

Mounted on partition 7 there is a housing 58 for a suitable electric timer mechanism 59 for operating a suitable timer switch 60 with relay 60—a in housing 61 mounted on partition 7. A housing 62 is mounted on partition 7 for a suitable manually operated control switch with operating lever 62—a extending through wall 1. A suitable conduit 63 passes through wall 1 and into housing 58, for the power lines W—1 and the wires W—2 from the humidostat 64.

Figure 1:
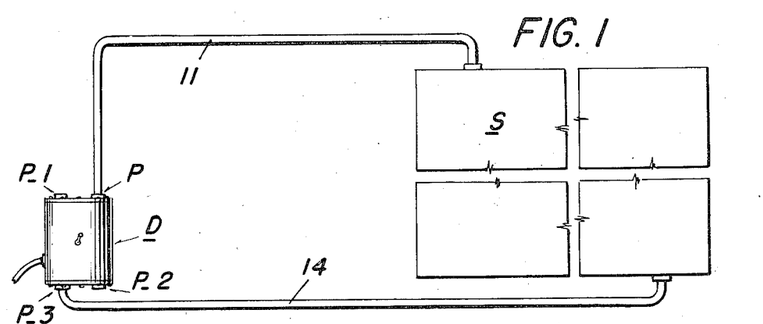
Fig. 1 is a diagrammatic view illustrating the use of my improved device for treatment of air in a confined space, such as a room.
Figure 2:
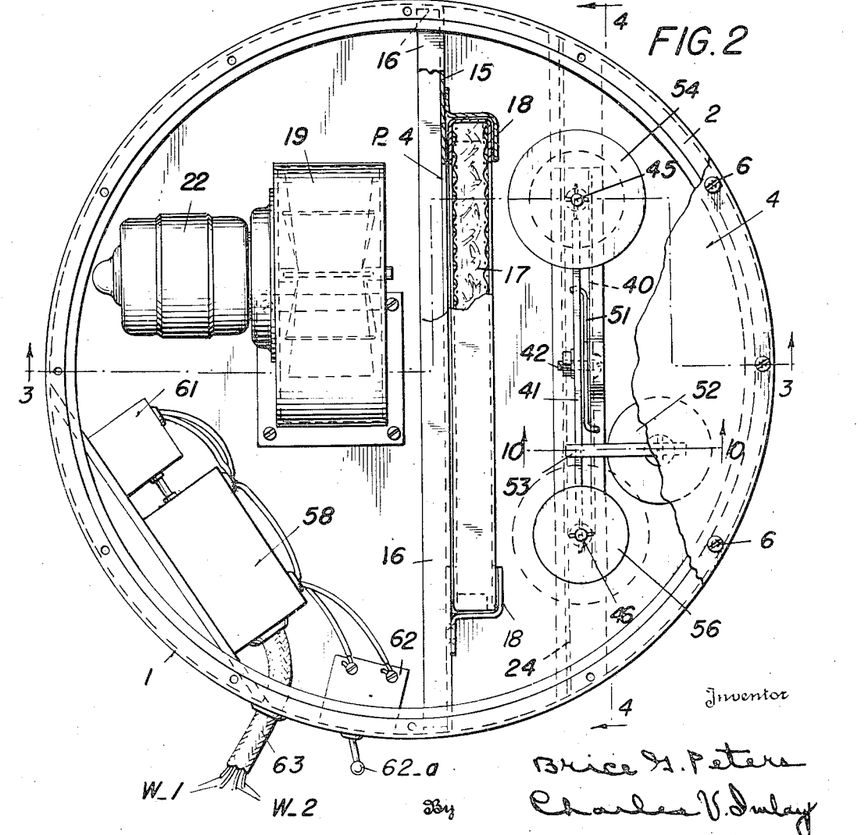
Fig. 2 is a top plan view of the device, the cover being broken away to disclose the elements of construction.
Figure 3:
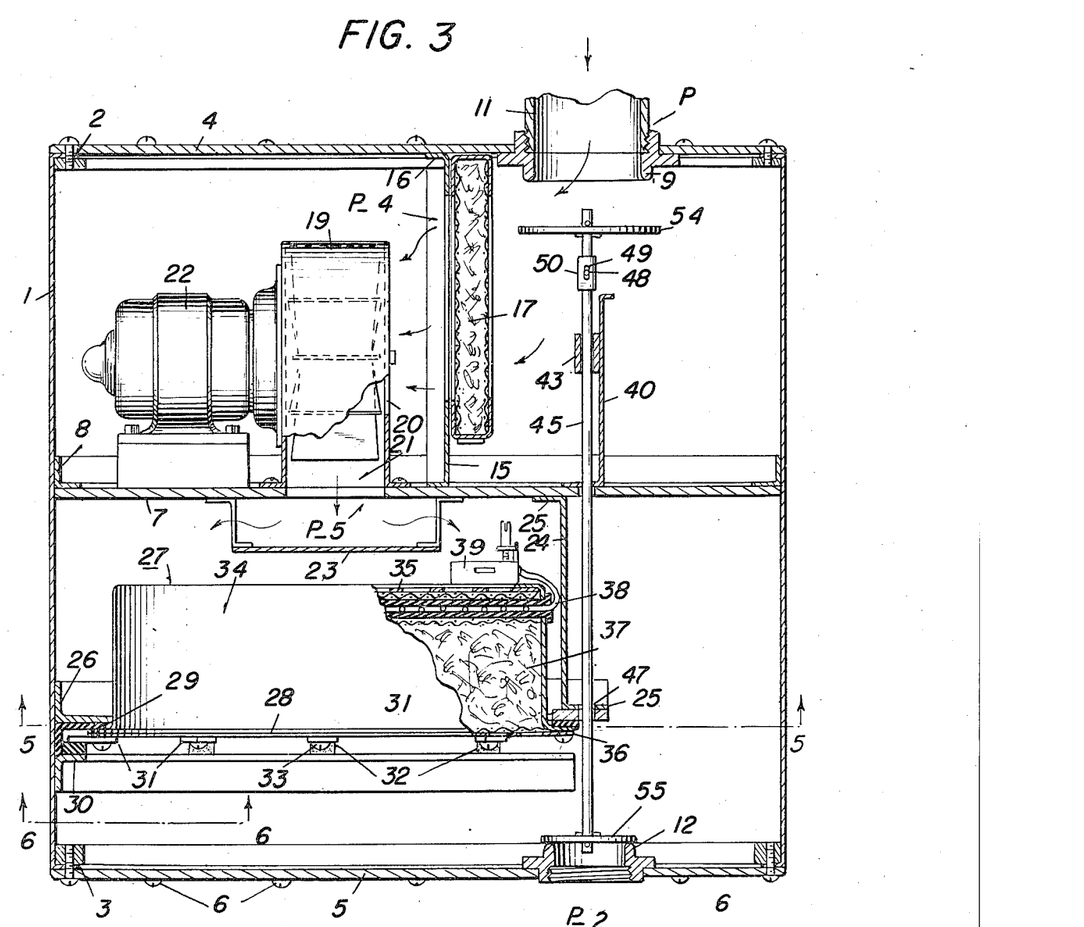
Fig. 3 is a vertical section on the line 3—3 of Fig. 2, in the direction of the arrows.
Figure 4:
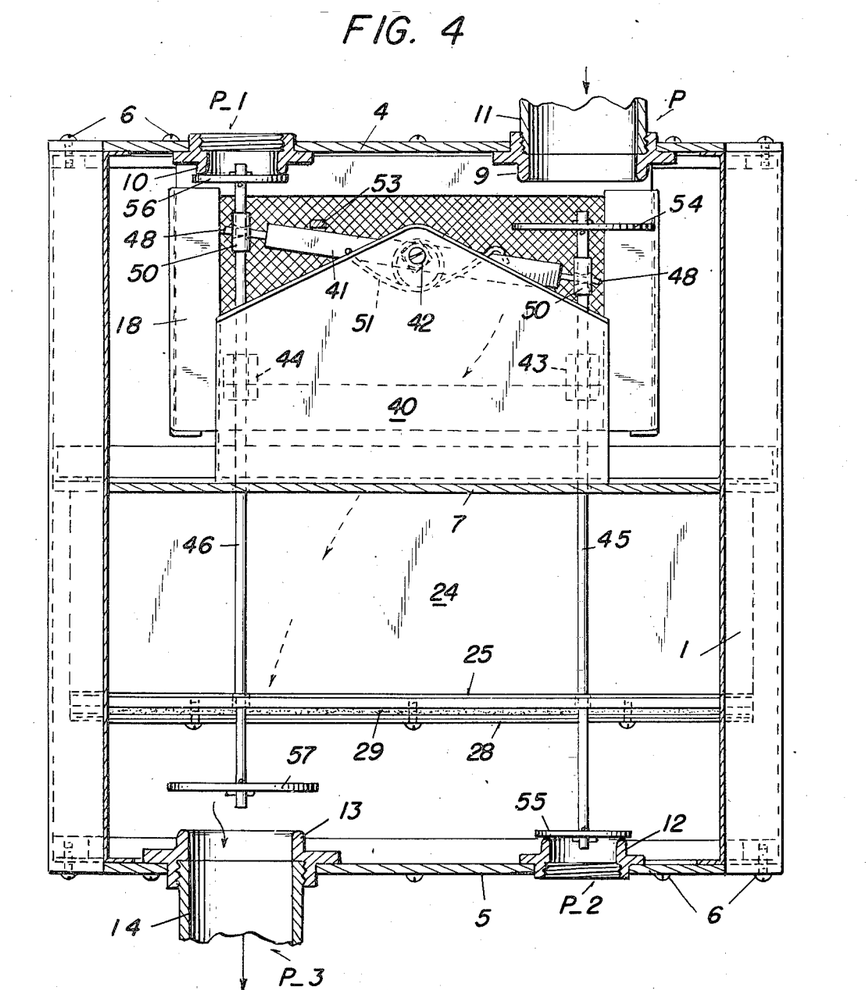
Fig. 4 is a vertical section, partly in elevation, on the line 4—4 of Fig. 2, in the direction of the arrows.
Figure 5:
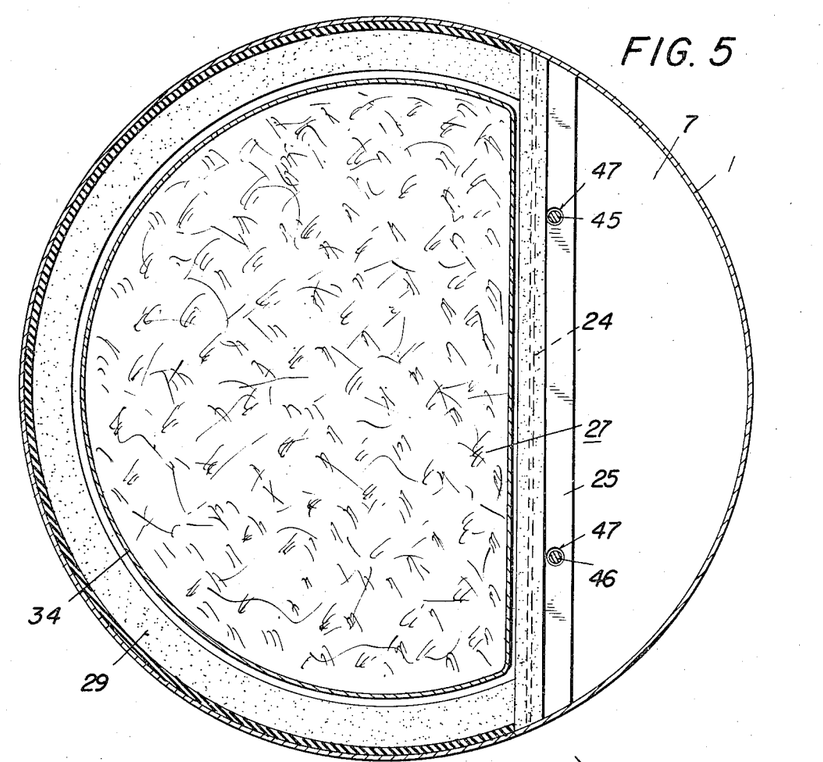
Fig. 5 is a horizontal section on the line 5—5 of Fig. 3, in the direction of the arrows.
Figure 6:
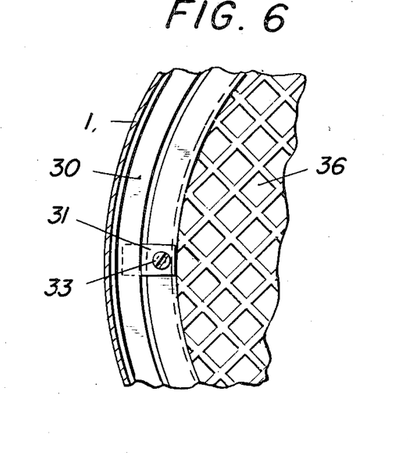
Fig. 6 is a fragmentary horizontal section on the line 6—6 of Fig. 3, in the direction of the arrows.
Figure 7:
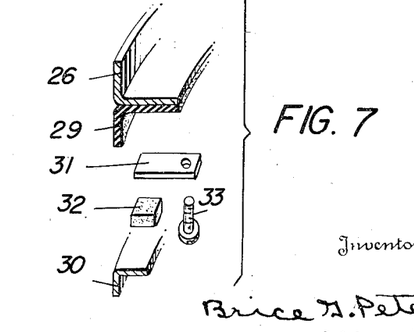
Fig. 7 is an exploded view of the insulating, retaining means for the desiccant container, shown assembled in Fig. 3.
Figure 8:
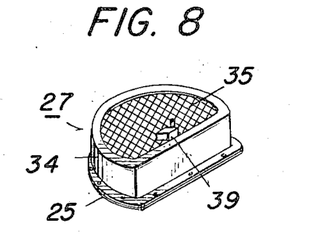
Fig. 8 is a reduced perspective of the desiccant container.
Figure 9:
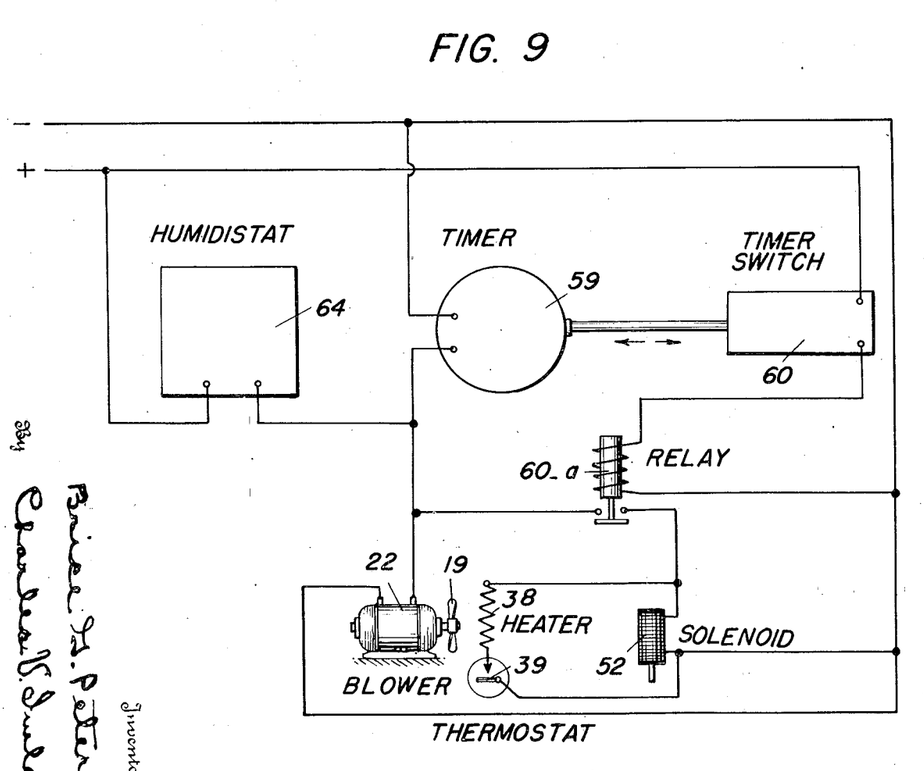
Fig. 9 is a wiring diagram of the circuits used in the device shown in Figs. 1–10.
Figure 10:
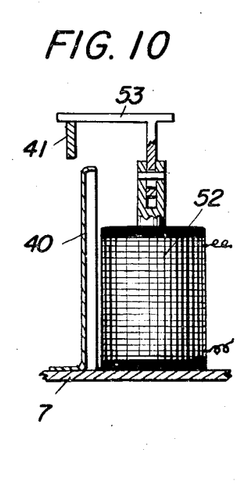
Fig. 10 is an enlarged section on the line 10—10 of Fig. 2.

Referring to Figures 2, 3 and 4, the space to the right of partition 15 and above partition 7 constitutes an air intake chamber having a pair of inlet ports P and P—1 therein, having valve seats around their margins, one port, P, communicating with the space to be dried and the other, P—1, communicating with a source of re-activating air. The space below partition 7, to the right of partition 24 and below the desiccant container 34 constitutes a discharge chamber having a pair of outlet ports P—2 and P—3 disposed therein, having valve seats around their margins. One outlet port, P—3, communicates with the space to be dried and the other, P—2, communicates with the outside atmosphere.

Figure 11:
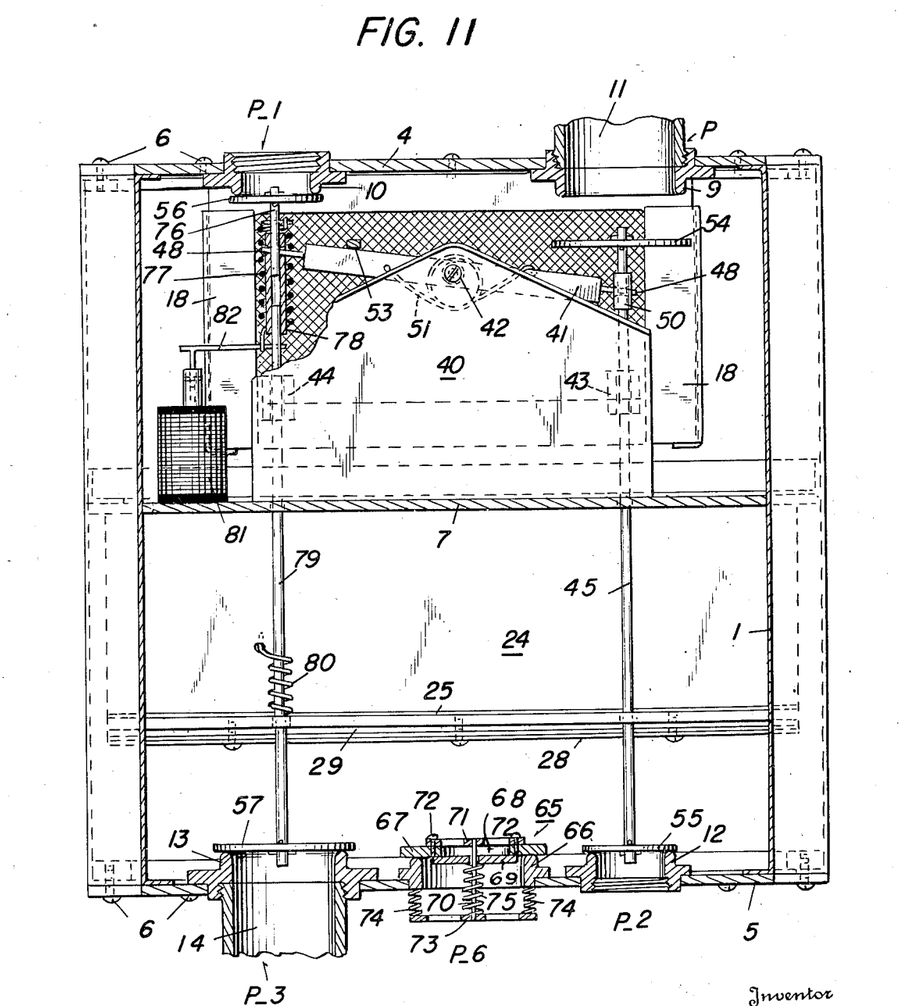
Fig. 11 is a view similar to Fig. 4, showing a modified form of the device.
Figure 12:
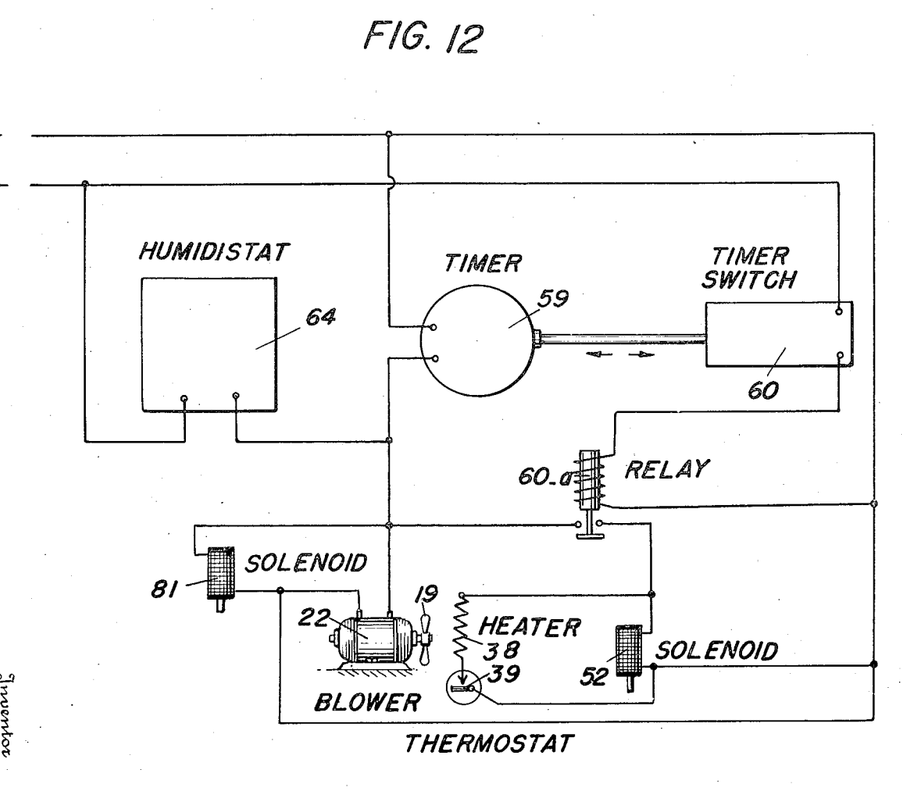
Fig. 12 is a diagram, similar to Fig. 9, of the circuits used in the modified form of the device shown in Fig. 11.

The modified form of the device, illustrated in Figs. 11 and 12, is designed to practice the second form of my improved method. This form of the device has a port P—6 provided in the cover plate 5 which has therein a double relief valve 65 comprising a valve-seat 66 with which co-acts a valve 67 having a co-axial orifice 68 with which co-acts a valve 69 through which loosely passes a rod 70 mounted in a spider 71 mounted on the upper side of valve 67 by bolts 72. The rod 70 carries on its lower end a spider 73 resiliently mounted on valve-seat 66 by expansion springs 74. An expansion spring 75 is coiled about rod 70 between valve 69 and spider 73.

In the modified form, the valve 56 for port P—1 has a valve-rod 76 urged upwardly by a coil spring 77 to normally close port P—1. The rod 76 is connected by pin 48 to lever 41 in the same way as rod 46 in the other form of the device. Rod 76 has a sleeve 78 on its lower end in which is slidably received the upper end of a valve-rod 79 for valve 57 for port P—3. The rod 79 is provided with a coil spring 80 to normally close port P—3. A solenoid 81 is mounted on partition 7 adjacent rod 79 and carries an operating finger 82 attached to rod 79.

I will now describe the operation of the device, illustrated in Figs. 1 to 10, in the practice of the first form of my improved method. The parts of the device being in the positions shown in the drawings and the manual control switch being closed by the lever 62—a to connect a source of electrical energy with the humidostat 64, the device D is conditioned to function. When the humidity in the confined space S exceeds a determined degree, the humidostat 64 functions to close the circuit to energize motor 22 which drives blower 19 which induces a flow of air from space S through the pipe 11, port P, filter 17, port P—4, blower 19, port P—5, container 27, port P—3 and pipe 14 to space S. This flow of air continues until the action of desiccant 37 upon the air is adequate to reduce the humidity in space S to the determined degree causing the humidostat 64 to open the circuit to de-energize the motor 22 to interrupt the above-described flow of air. While the above-described flow of air continues, due to the closed circuit to motor 22, the timer 59 functions, thereby timing the period of operation of the desiccant 37 upon the air. When the desiccant 37 has operated for a determined time interval, the timer 59 actuates the time switch 60 which actuates the relay 60—a which closes the circuit to the heater 38 in container 27, to solenoid 52 and to motor 22. The solenoid 52 being thus energized causes its finger 53 to reciprocate lever 41 against pressure of spring 51 to reciprocate rods 45 and 46 which causes valves 54 and 57 to seat and close ports P and P—3, and valves 55, 56 are caused to be unseated to open ports P—1 and P—2. The motor 22 being energized causes blower 19 to induce a flow of air, from atmosphere about device D, through port P—1, filter 17, port P—4, blower 19, port P—5, container 27 and port P—2, back to atmosphere. Due to the heater 38 in container 27 being energized, the air flowing through the container 27 is heated to a sufficient degree to cause the desiccant 37 to release the moisture adsorbed thereby in the preceding period of the cycle of operation, thereby reactivating the desiccant 37. An unduly high temperature is prevented by the thermostatic safety switch 39. While the above-described reactivation flow of air continues, due to the closed circuit to the motor 22, the timer 59 functions, thereby timing the period of reactivation. When the desiccant 37 has released the adsorbed moisture during a determined time interval in which the desiccant 37 is sufficiently reactivated, the timer 59 actuates the time switch 60 which operates the relay 60—a to open the circuit thereby deenergizing heater 38, solenoid 52 and motor 22. When the solenoid 52 is deenergized, the spring 51 reciprocates lever 41 to restore the parts to their positions as illustrated in the drawings, ending the second period of the cycle of operations and conditioning the device D for a renewed cycle.

It is obvious that, since the functioning of the device D during the first period of the cycle of operation is dependent upon the degree of humidity in space S, the said functioning may be continuous or intermittent. In either event, since the actuation of the timer 59 is co-incident with the actuation of the motor 22 which effects the functioning of the device D, the timer 59 accurately measures the time interval during which the desiccant 37 adsorbs moisture from the air flowing from space S, regardless of whether said interval is comprised of a single period of continuous operation or the sum of a series of periods of intermittent operation. The second period, reactivation period, being determined by the timer 59, is continuous. I have found that the first period should be approximately two and one-half hours duration, and the second period approximately one half hour.

I will now describe the operation of the form of the device illustrated in Figs. 11 and 12, in the practice of the second form of my improved method. Be it assumed that the conduit 11 of the device is connected to the interior of an otherwise hermetically sealed chamber, such as a storage container, subject to temperature variations causing expansion and contraction of the mass of air confined therein. As illustrated in Fig. 11, the device is conditioned so that port P with which conduit 11 connects is open, and ports P—1, P—2 and P—3 are closed. On expansion of the mass of air in the chamber, caused by elevation of temperature, air flows from the chamber through the pipe 11 and port P into the device and passes through the device to escape therefrom into the atmosphere through the port P—6, the relief valve 65 being caused to function by the pressure of the air inside of the device on valve 69 which is unseated against pressure of its spring 75. On contraction of the mass of air in the chamber, caused by reduction of temperature, air from the atmosphere flows through port P—6, the relief valve 65 being caused to function by the atmospheric pressure, exceeding the pressure of the air in the chamber and consequently the pressure of the air in the device, on the valve 67 which is unseated against pressure of its springs 74. The air thus admitted through port P—6 is caused, by the difference of pressure within and without the chamber, to flow through container 27, port P—5, blower 19, port P—4, filter 17, port P and pipe 11 to the chamber. Because of its construction, blower 19 permits this flow of air to occur when the blower 19 is immobile. It will be observed that the air thus supplied to the chamber is dehumidified by its passage through container 27. In this form of the device, when the humidostat 64 closes the circuit to cause the device to function to dehumidify the air in the chamber, as above described, the closed circuit energizes the solenoid 81 causing its finger 82 to reciprocate rod 79 against the force of its spring 80, unseating valve 57 to open port P—3, putting the device into communication with the chamber through port P—3 and the pipe 14 for functioning of the device through the initial period of the cycle of operation. It will be noted that when this occurs, the rod 79 is moved upwardly until its upper end guided in sleeve 78 contacts the lower end of rod 76. When the parts are moved into positions to condition the device for functioning through the reactivation period, as above described, the lever 41 reciprocates rod 76 against the force of its spring 77 to unseat valve 56 to open port P—1 and to reciprocate rod 79 aided by its spring 80 to seat valve 57 to close port P—3. It is obvious that when the device is modified, at the end of the reactivation period, the port P—3 remains closed since the solenoid 81 is deenergized and spring 80 causes rod 79 to maintain valve 57 seated, and the parts are properly positioned for the functioning of the device for flow of air into and out of the chamber through port P—6 and valve 65 according to pressure variations due to temperature variations. It is also obvious that valve 65 is immobilized, during the two periods of dehumidification and reactivation, due to the flow of air through the device being caused by functioning of the blower 19.

Having described my invention, what I claim is:

1. A dehumidification apparatus comprising a casing having top, side, and bottom walls, a partition dividing the interior thereof into intake and discharge chambers, a second partition in the intake chamber having an opening therein, dividing the same into an inlet compartment and a blower compartment, a blower in the blower compartment adapted to deliver air drawn from the inlet compartment through said opening to the discharge chamber, a body of desiccant material in the discharge chamber through which the air is forced by the blower, two intake openings in the intake chamber, two openings in the discharge chamber, a pair of valve rods extending through the first mentioned partition aligned with said openings, a valve on each end of each rod, means connected to the rods to reciprocate the rods simultaneously in opposite directions, thereby to close the one intake opening and to open one discharge opening of one pair and to open the one intake opening and to close the discharge opening of the other pair, and means for actuating the last mentioned means to control the flow through said pairs of openings for air drying and for reactivation of the adsorbent, respectively.

2. An apparatus in accordance with claim 1 in which the means for reciprocating the rods comprises an intermediately pivoted lever connected at its ends to the rods, to move the same equidistantly and simultaneously in opposite directions.

3. An apparatus in accordance with claim 1, characterized in that a plate, projecting transversely from the first mentioned partition carries guide means for said rods.

4. An apparatus in accordance with claim 1, in which for reciprocating the rods comprises an intermediately pivoted lever, and in which a plate, projecting from the first mentioned partition, supports the fulcrum for said lever.

5. An apparatus in accordance with claim 4, in which the plate, projecting from the first mentioned partition, also supports a pair of guides for the rods.

6. A dehumidification apparatus comprising a casing, a partition therein dividing the interior thereof into an air intake chamber and an air discharge chamber, a pair of inlet ports in the intake chamber having valve seats around their margins, one port communicating with the space to be dried and the other with an external source of reactivating air, a pair of outlet ports in the discharge chamber having valve seats around their margins, one outlet port communicating with the space to be dried and the other with the outside atmosphere, a single blower within the casing positioned to cause air flow in one direction only from an inlet port and the intake chamber to the discharge chamber and an outlet port, a bed of desiccant material within the casing in the path of said air flow and through which the air is forced to pass in the same direction at all times, electrical heating means intimately associated with said bed for heating the material thereof, two pairs of valves arranged for cooperation with said valve seats for opening and closing said ports, a pair of longitudinally movable shafts, upon the opposite ends of which said valves are mounted, means connected to the shafts for moving the same in unison longitudinally, thereby to bring, simultaneously, one valve of each pair into port closing position and the other valve of each pair into port opening position, the valves being movable from a normal, air drying position in which the first mentioned inlet port and the first mentioned outlet port are open and the second mentioned inlet and outlet ports are closed, to a re-activating position in which the second mentioned inlet and outlet ports are open and the first mentioned inlet and outlet ports are closed, and means for delivering current to the heating means when the valves are shifted to the second position.

7. An apparatus in accordance with claim 6, in which the shafts upon which the valves are mounted extend in parallel relation through the partition between the inlet and outlet chambers.

8. An apparatus in accordance with claim 6 in which the means for moving the shafts in unison comprises an oscillatable member connected thereto, spring means tending to oscillate the member in one direction, and electrically actuated power means for oscillating the member in the other direction against the force of said spring means.

9. Apparatus in accordance with claim 6 in which the bed of desiccant material is contained within a container having metallic side walls and pervious top and bottom walls and in which said container is carried by the apparatus casing with bodies of heat insulating material interposed therebetween, to prevent the dissipation and transmission of heat, during re-activation of the desiccant material, from the container to the casing.

10. An apparatus in accordance with claim 6 characterized in that the inlet and outlet ports communicating with the space to be dried are of relatively large size and in that the inlet and outlet ports communicating with the source of re-activating air and outside atmosphere are of materially smaller diameter.

11. In a dehumidifying apparatus of the type comprising a casing, a container having desiccant material therein disposed within the casing, an electric heater for the desiccant material, and means for circulating room air through the casing and the container for air drying and for circulating air for re-activating the desiccant through the casing and container to external atmosphere when the heater is energized; means for supporting the container in the casing in completely isolated, heat non-transferring relation to the casing, thereby to concentrate the re-activating heat to and within the container and to prevent the dissipation and transfer of heat to the casing, said supporting means comprising bodies of heat insulating material between the casing and the container.

BRICE G. PETERS.

REFERENCES CITED

The following references are of record in the file of this patent:

UNITED STATES PATENTS

| Number | Name | Date |
|---|---|---|
| 1,667,316 | Hartman | Apr. 24, 1928 |
| 1,759,971 | Austin | May 27, 1930 |
| 1,863,656 | Hartman | June 21, 1932 |
| 1,986,814 | Hartman | Jan. 8, 1935 |
| 2,052,931 | Lednum | Sept. 1, 1936 |
| 2,075,036 | Hollis | Mar. 30, 1937 |
| 2,160,831 | Colby | June 6, 1939 |
| 2,201,688 | Zuhlke | May 21, 1940 |
| 2,248,225 | Fonda | July 8, 1941 |